(12) United States Patent
Smith et al.

(10) Patent No.: US 9,242,597 B2
(45) Date of Patent: Jan. 26, 2016

(54) VEHICLE ACCELERATION COMMUNICATION SYSTEM USING LIGHTS

(71) Applicant: FORCELIGHTS, LLC, Wichita, KS (US)

(72) Inventors: Sunny P. Smith, Wichita, KS (US); Gene Y. Fridman, Baltimore, MD (US)

(73) Assignee: FORCELIGHTS, LLC, Wichita, KS (US)

( * ) Notice: Subject to any disclaimer, the term of this patent is extended or adjusted under 35 U.S.C. 154(b) by 29 days.

(21) Appl. No.: 14/167,840

(22) Filed: Jan. 29, 2014

(65) Prior Publication Data
US 2014/0145842 A1 May 29, 2014

Related U.S. Application Data

(63) Continuation of application No. 13/783,159, filed on Mar. 1, 2013, now Pat. No. 8,860,567, which is a continuation of application No. 13/361,656, filed on Jan. 30, 2012, now Pat. No. 8,405,498.

(51) Int. Cl.
| G08B 21/00 | (2006.01) |
| B60Q 1/54 | (2006.01) |
| B60R 21/01 | (2006.01) |
| B60Q 1/52 | (2006.01) |
| B60Q 1/26 | (2006.01) |

(52) U.S. Cl.
CPC ............... *B60Q 1/54* (2013.01); *B60Q 1/2615* (2013.01); *B60Q 1/2696* (2013.01); *B60Q 1/52* (2013.01); *B60R 21/01* (2013.01)

(58) Field of Classification Search
CPC ............................. B60Q 1/2615; B60Q 1/52
USPC ................ 340/425.5, 467–479; 362/459, 487
See application file for complete search history.

(56) References Cited

U.S. PATENT DOCUMENTS

| 5,712,618 | A | * | 1/1998 | McKenna ..................... 340/475 |
| 5,844,479 | A | | 12/1998 | Walton |
| 6,211,780 | B1 | | 4/2001 | Kashefy |
| 6,268,793 | B1 | | 7/2001 | Rossi |
| 6,282,942 | B1 | | 9/2001 | Husby |
| 7,956,490 | B2 | | 6/2011 | Sotnikow et al. |
| 8,294,564 | B1 | | 10/2012 | Smith et al. |
| 8,405,498 | B1 | | 3/2013 | Smith et al. |
| 8,860,567 | B2 | | 10/2014 | Smith et al. |
| 2003/0030554 | A1 | | 2/2003 | Yavitz |
| 2006/0103517 | A1 | | 5/2006 | Martin |

(Continued)

OTHER PUBLICATIONS

Office Action (Pre-Interview Communication), dated Apr. 12, 2012, for U.S. Appl. No. 13/361,656, entitled "Automated Vehicle Crash Warning System Using External Lights," filed Jan. 30, 2012, Sunny P. Smith and Gene Fridman, inventors.

(Continued)

*Primary Examiner* — Jeffery Hofsass
(74) *Attorney, Agent, or Firm* — McDermott Will & Emery LLP

(57) ABSTRACT

An acceleration communication system may communicate acceleration information about a transportation apparatus to one or more persons. A lighting system may be attached to the transportation apparatus. An acceleration detector may detect the direction of lateral acceleration of the transportation apparatus. A light controller may cause the lighting system to illuminate in a manner that indicates the direction of the lateral acceleration detected by the acceleration detector.

12 Claims, 2 Drawing Sheets

(56) References Cited

U.S. PATENT DOCUMENTS

2007/0040664 A1    2/2007   Johnson et al.
2007/0285220 A1*   12/2007  Pedrick .................... 340/468
2008/0309477 A1    12/2008  Dakov

OTHER PUBLICATIONS

Examiner's Interview Summary, dated May 30, 2012, for U.S. Appl. No. 13/361,656, entitled "Automated Vehicle Crash Warning System Using External Lights," filed Jan. 30, 2012, Sunny P. Smith and Gene Fridman, inventors.

Examiner's Interview Summary, dated Jun. 6, 2012, for U.S. Appl. No. 13/361,656, entitled "Automated Vehicle Crash Warning System Using External Lights," filed Jan. 30, 2012, Sunny P. Smith and Gene Fridman, inventors.

Office Action (Pre-Interview Communication), dated Apr. 12, 2012, for U.S. Appl. No. 13/361,617, entitled "Vehicle Acceleration Communication System Using External Lights," filed Jan. 30, 2012, Sunny P. Smith and Gene Fridman, inventors.

Examiner's Interview Summary, dated May 30, 2012, for U.S. Appl. No. 13/361,617, entitled "Vehicle Acceleration Communication System Using External Lights," filed Jan. 30, 2012, Sunny P. Smith and Gene Fridman, inventors.

Notice of Allowance and Fees Due, dated Jul. 2, 2012, for U.S. Appl. No. 13/361,617, entitled "Vehicle Acceleration Communication System Using External Lights," filed Jan. 30, 2012, Sunny P. Smith and Gene Fridman, inventors.

Notice of Allowance and Fees Due, dated Nov. 27, 2012, for U.S. Appl. No. 13/361,656, entitled "Automated Vehicle Crash Warning System Using External Lights," filed Jan. 30, 2012, Sunny P. Smith and Gene Fridman, inventors.

Notice of Allowance and Fees Due, dated Jun. 11, 2014, for U.S. Appl. No. 13/783,159, entitled "Automated Vehicle Crash Warning System Using External Lights," filed Mar. 1, 2013, Sunny P. Smith and Gene Fridman, inventors.

\* cited by examiner

VEHICLE ACCELERATION COMMUNICATION SYSTEM USING LIGHTS

CROSS-REFERENCE TO RELATED APPLICATIONS

This application is a continuation application of U.S. patent Application Ser. No. 13/783,159, entitled "Automated Vehicle Crash Warning System Using External Lights," filed Mar. 1, 2013, which is a continuation of U.S. Patent Application continuation application of U.S. patent application Ser. No. 13/361,656 (now U.S. Pat. No. 8,405,498, issued Mar. 26, 2013), entitled "Automated Vehicle Crash Warning System Using External Lights," filed Jan. 30, 2012.

This application is also related to U.S. Pat. No. 8,294,564 B1, entitled "Vehicle Acceleration Communication System Using External Lights" issued Oct. 23, 2012.

The entire content of each of these applications and patents is incorporated herein by reference.

TECHNICAL FIELD

This disclosure relates to vehicles and to vehicle-related systems.

SUMMARY

An acceleration communication system may communicate acceleration information about a transportation apparatus to one or more persons. A lighting system may be attached to the transportation apparatus. An acceleration detector may detect the direction of lateral acceleration of the transportation apparatus. A light controller may cause the lighting system to illuminate in a manner that indicates the direction of the lateral acceleration detected by the acceleration detector.

The acceleration detector may detect the degree of the acceleration. The light controller may cause the lighting system to illuminate in a manner that reflects the degree of acceleration detected by the acceleration detector.

The lighting system may illuminate at different controllable intensities. The light controller may cause the intensity of the illumination of the lighting system to track the degree of acceleration detected by the acceleration detector.

The light controller may cause the lighting system to flash at a rate that tracks the degree of acceleration detected by the acceleration detector.

An acceleration communication system may communicate acceleration information about a transportation apparatus to one or more persons. A lighting system may be attached to the transportation apparatus that provides controllable colors and intensities of illumination. An acceleration detector may detect acceleration of the transportation apparatus. A light controller may cause the lighting system to illuminate when acceleration of the transportation apparatus is detected by the acceleration detector and to cause the color or intensity of the illumination of the lighting system to change based on the degree of acceleration detected by the acceleration detector. The rate of change may be dynamically set based on a maximum detected transportation apparatus acceleration.

The light controller may cause the lighting system to illuminate at at least three different levels based on the degree of acceleration detected by the acceleration detector.

The lighting system may include one or more strips of LEDs. Each of the one or more strips of LEDs may include different LED color channels.

The lighting system may include one or more lights configured to be attached to each side of the transportation apparatus. The light controller may cause the one or more lights configured to be attached on the side of the transportation apparatus to which the transportation apparatus is laterally accelerating, as detected by the acceleration detector, to illuminate, but not the one or more lights configured to be attached on the other side of the transportation apparatus.

An acceleration communication system may communicate acceleration information about a transportation apparatus to one or more persons. A lighting system may be attached to the transportation apparatus that provides different controllable colors of illumination. An acceleration detector may detect acceleration of the transportation apparatus. A light controller may cause the lighting system to illuminate when acceleration of the transportation apparatus is detected by the acceleration detector and to cause the color of the illumination of the lighting system to change based on the degree of acceleration detected by the acceleration detector. The lighting system may illuminate each color at different controllable intensities. The light controller may cause the color of the illumination of the lighting system to change at stepped intervals based on the degree of acceleration detected by the acceleration detector; and vary the intensity of each color of illumination within each stepped interval based on the degree of acceleration detected by the acceleration detector within that stepped interval.

The light controller may include a user sensitivity control configured to allow a user of the acceleration communication system to set the rate at which changes in color take place as a result of detected acceleration.

An acceleration/deceleration communication system may communicate acceleration and deceleration information about a transportation apparatus to one or more persons. Lights may be configured to be attached to the front and each side of the transportation apparatus. An acceleration/deceleration detector may detect the conditions of acceleration and deceleration of the transportation apparatus. A light controller may cause: the detection of one of the conditions by the detector to cause the lights configured to be attached to the front but not the sides of the transportation apparatus to illuminate; and the detection of the other of the conditions by the detector to cause the lights configured to be attached to the sides but not the front of the transportation apparatus to illuminate.

The light controller may cause the lighting system to display numerical information indicative of the degree of acceleration detected by the acceleration detector.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
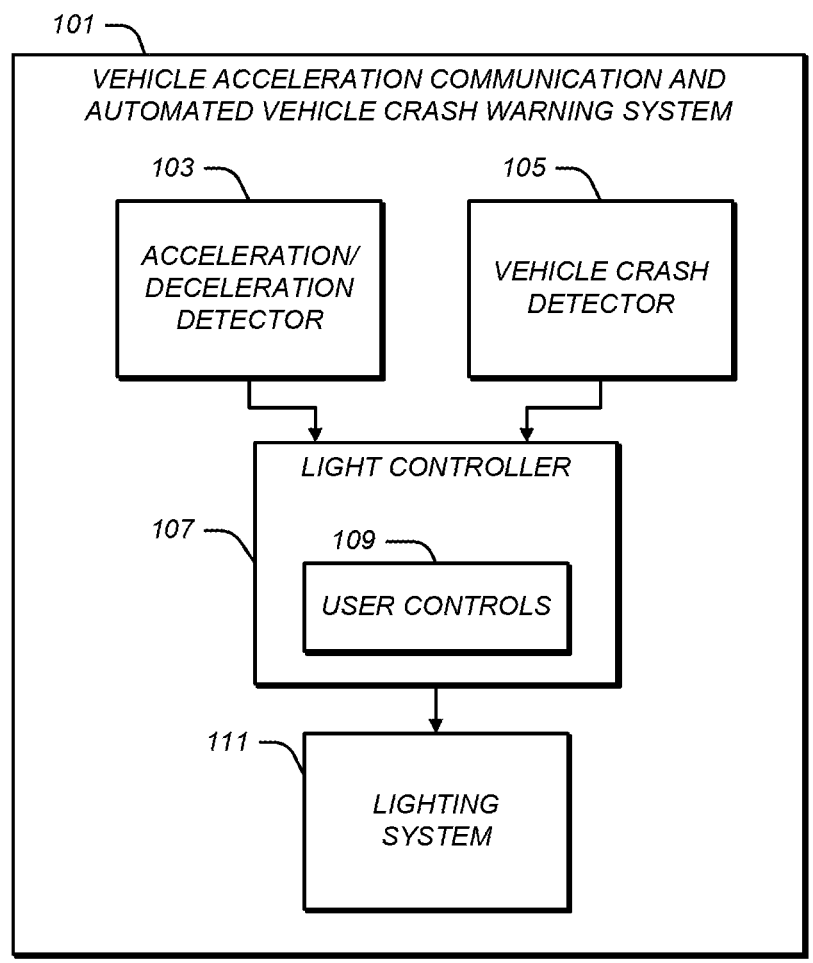
FIG. 1 illustrates an example of a vehicle acceleration communication and automated vehicle crash warning system.

FIG. 1 illustrates an example of a vehicle acceleration communication and automated vehicle crash warning system 101. As illustrated in FIG. 1, the vehicle acceleration communication and automated vehicle crash warning system 101 may include an acceleration/deceleration detector 103, a vehicle crash detector 105, a light controller 107, user controls 109, and a lighting system 111.

The acceleration/deceleration detector 103 may be configured to detect acceleration and deceleration of a vehicle, respectively. The vehicle may be of any type, such as an automobile, truck, motorcycle, airplane, or boat.

The acceleration/deceleration detector 103 may be a single detector that detects both acceleration and deceleration or a separate detector for each. The detector(s) may be of any type. For example, the detector(s) may (each) consist of or include an accelerometer that may be configured to detect both acceleration and deceleration in three dimensions, such as a 3D MEMS accelerometer. The accelerometer may in addition or instead include a GPS receiver and a processing system configured to extract acceleration information from the GPS coordinates that are received. The accelerometer may in addition or instead include the vehicle's speedometer and appropriate electronics and/or a computing system that takes the derivative of the speed information developed by it.

The acceleration/deceleration detector 103 may be configured to detect the degree of acceleration and/or deceleration.

The acceleration/deceleration detector 103 may be configured to detect the direction and/or degree of lateral acceleration and/or deceleration, respectively.

The vehicle crash detector 105 may be configured to detect a crash of the vehicle. The vehicle crash detector 105 may be of any type, such as any the types discussed above in connection with the acceleration/deceleration detector 103. The vehicle crash detector may be the same system that is used to activate inflatable airbags. The vehicle crash detector 105 may be the same as or different from the acceleration/deceleration detector 103.

The lighting system 111 may be configured to be attached to the outside of the vehicle. The lighting system 111 may be of any type. For example, the lighting system 111 may be configured to illuminate at different controllable intensities. The lighting system 111 may be configured to provide different controllable colors of illumination. The lighting system 111 may be configured to illuminate each different color at different controllable intensities.

The lighting system 111 may include a two-dimensional matrix of pixels, such as an LCD display.

The lighting system 111 may include one or more strips of LEDs. Each strip may include multiple LEDs in any configuration, such as a line of LEDs. Each strip of LEDs may include multiple color channels. For example, each strip of LEDs may include a red, green, and blue color channel. Each color channel may be configured to be separately illuminated. Each color channel may consist of one or more LEDs which, when illuminated, illuminate with the color of the channel. When multiple LEDs are used for a single color, the LEDs may be in any arrangement. For example, the LEDs for each color may be grouped together or interleaved with the LEDs for the other colors.

The lighting system 111 may utilize any means to facilitate its attachment to the outside of the vehicle. These means may include, for example, adhesive material, suction cups, screws, and/or clamps. When implemented with strips of LEDs, for example, the lighting system 111 may include adhesive material on the back of each strip with a protective backing that can be pealed away to expose a strip of adhesive material when attaching the strip to the vehicle.

The light controller 107 may be configured to cause the lighting system 111 to illuminate when acceleration and/or deceleration of the vehicle is detected by the acceleration/deceleration detector 103. The light controller 107 may be configured to cause the lighting system 111 to illuminate in a manner that reflects the degree of acceleration and/or deceleration detected by the acceleration/deceleration detector 103.

For example, the light controller 107 may be configured to cause the intensity of the illumination of the lighting system 111 to track the degree of acceleration and/or deceleration detected by the acceleration/deceleration detector 103. The light controller 107 may be configured to cause the lighting system 111 to illuminate only slightly when the vehicle is accelerating and/or decelerating slowly, moderately when the vehicle is accelerating and/or decelerating moderately, and brightly when the vehicle is accelerating and/or decelerating greatly. The light controller 107 may be configured to cause the intensity to vary continuously with changes in the acceleration and/or deceleration or at stepped intervals.

The light controller 107 may in addition or instead be configured to cause the lighting system 111 to flash at a rate that tracks the degree of acceleration and/or deceleration detected by the acceleration/deceleration detector 103. For example, the light controller 107 may be configured to cause the lighting system 111 to flash slowly when the vehicle is accelerating and/or decelerating slowly, moderately when the vehicle is accelerating and/or decelerating moderately, and rapidly when the vehicle is accelerating and/or decelerating greatly. The light controller 107 may be configured to cause the flash rate to vary continuously with changes in the acceleration and/or deceleration or at stepped intervals.

The light controller 107 may in addition or instead be configured to make changes to the color based on the degree of acceleration and/or deceleration detected by the acceleration/deceleration detector 103. For example, the light controller 107 may be configured to cause the lighting system 111 to illuminate with green light when the vehicle is accelerating and/or decelerating slowly, with blue light when the vehicle is accelerating and/or decelerating moderately, and with red light when the vehicle is accelerating and/or decelerating greatly. The light controller 107 may be configured to cause the color to vary continuously with changes in the acceleration and/or deceleration or at stepped intervals.

The light controller 107 may in addition or instead be configured to cause the lighting system 111 to make changes to at least two of the intensity, color and/or flash rate simultaneously based on the degree of acceleration and/or deceleration detected by the acceleration/deceleration detector 103. The light controller 107 may be configured to cause these changes to be made continuously with changes in the acceleration and/or deceleration, at stepped intervals, or continuously in connection with one of these ways and at stepped intervals in connection with another of these ways.

The light controller 107 may in addition or instead be configured to cause the lighting system 111 to make changes in one of these ways at stepped intervals and changes in another way at sub-intervals within each step, either continuously or in stepped intervals. For example, the light controller 107 may be configured to cause the color of the illumination of the lighting system 111 to change at stepped intervals based on the degree of acceleration and/or deceleration detected by the acceleration/deceleration detector 103, and to vary the intensity of each color of illumination within each stepped interval based on the degree of acceleration and/or deceleration detected by the acceleration/deceleration detector 103 within that stepped interval, either on a continuous or stepped basis.

The light controller 107 may be configured to cause the lighting system 111 to display numerical information indicative of the degree of acceleration and/or deceleration detected by the acceleration/deceleration detector 103.

The light controller 107 may be configured to cause the lighting system 111 to illuminate when deceleration of the vehicle is detected by the acceleration/deceleration detector 103 in a manner that is different than when acceleration of the vehicle is detected by the acceleration/deceleration detector 103. For example, the light controller 107 may be configured to cause one or more lights in the lighting system 111 that are mounted to the outside of the vehicle at a first location, but not a second location, to illuminate when acceleration of the vehicle is detected by the acceleration/deceleration detector 103. Similarly, the light controller 107 may be configured to cause one or more lights of the lighting system 111 that are mounted to the outside of the vehicle at a second location, but not the first location, to illuminate when deceleration of the vehicle is detected by the acceleration/deceleration detector 103.

The light controller 107 may be configured to cause the manner in which the lighting system 111 reflects the degree of acceleration of the vehicle to be different from the manner in which the lighting system reflects the degree of deceleration of the vehicle. For example, the light controller 107 may be configured to cause the lighting system to continuously illuminate during acceleration at an intensity that tracks the acceleration, but to flash during deceleration, again at an intensity that tracks the deceleration.

The light controller 107 may be configured to cause the lighting system 111 to illuminate in a manner that indicates the direction of lateral acceleration and/or deceleration of the vehicle as detected by the acceleration/deceleration detector 103. For example, the light controller 107 may be configured to cause one or more lights configured to be mounted on a side of the vehicle to which the vehicle is laterally accelerating and/or decelerating, as detected by the acceleration/deceleration detector 103, to illuminate, but not one or more lights configured to be mounted on the other side of the vehicle.

The light controller 107 may be configured to cause the lighting system 111 to illuminate when a crash of the vehicle is detected by the vehicle crash detector 105. The light controller 107 may be configured to cause the illumination of the lighting system 111 to persist for a substantial period after a crash of the vehicle is detected by the vehicle crash detector 105, such as for equal to or greater than one minute, ten minutes, twenty minutes, or thirty minutes. The light controller 107 may be configured to cause the lighting system 111 to illuminate when a crash of the vehicle is detected by the vehicle crash detector 105 in a manner that is different from the manner in which the light controller 107 cause the lighting system 111 to indicate acceleration and/or deceleration of the vehicle. A back-up power source such as a battery (that may be separate from the vehicle's battery) may be included in the automated vehicle crash warning system and configured to power the vehicle crash detector 105, the light controller 107, and the lighting system 111 in the even of a crash and the loss of the normal power provided by the vehicle.

The light controller 107 may include one or more user controls 109. One of the user controls 109 may be configured as a user sensitivity control that allows a user to set the level of acceleration and/or deceleration at which the light controller 107 causes the lighting system 111 to illuminate. The user sensitivity control may in addition or instead regulate the rate at which changes in acceleration and/or deceleration cause changes in the intensity, flashing rate and/or color of the illumination of the lighting system 111. Another of the user controls 109 may be configured as a user light show control that allows a user to cause the lighting system 111 to provide a light show independent of the acceleration or deceleration of the vehicle. Such a light show, for example, may consist of one or more entertaining patterns of flashings, color changes, intensity changes, or any combination of these. Each user control may be a mechanical switch, a soft button on a display, or any other type of user-operable control.

The light controller 107 and the lighting system 111 may be configured to generate illumination that tracks acceleration and/or deceleration in vastly different ways.

In automotive applications (e.g., cars, trucks, tractor trailers, motorcycles, and bicycles), for example, colors may change as acceleration or deceleration increases and/or decreases. Color changes may be dynamically set based upon a maximum value of acceleration or deceleration. The lights may flash when preset or dynamic values are achieved. Flashing red may denote an emergency stop; flashing white may denote maximum acceleration (e.g., >1 g); and all lighting may flash when acceleration over a preset period of time has been achieved. A cockpit gauge may show acceleration in real time and may store a high acceleration and/or deceleration value. The high values can be reset, the dynamic value cap can be reset, and a lightshow can be started. A light show may take place both at both system startup and on-demand from the cockpit. The show may include an artistic collage of both random and programmed light sequences that are unique and attractive. There may also be a warning mode. If the system detects deceleration indicative of a crash, the system may flash all lights.

In auto racing applications, colors may change as acceleration or deceleration increases and/or decreases. The color changes may be based upon a predetermined table that is utilized by all the cars in the race (level). The lights may flash when preset or dynamic values are achieved. Flashing red may denote an emergency stop; and flashing white may denote that an exceptional speed and/or acceleration has been achieved. All flashes may denote that push-to-pass, kers, or another power enhancement system has been activated. A cockpit gauge may show lateral acceleration in real time and may function as a driving aid to help the driver be smooth. There may be a light show at both system startup and on-demand from the cockpit that may include an artistic collage of both random and programmed light sequences that are unique and attractive. There may be a parade mode that can be activated from the cockpit that causes the system to implement a different method of illumination that is attractive to the audience on a warm-up or parade lap. There may be a warning mode. If the system detects deceleration indicative of a crash, the system may flash all lights to warn other drivers. In the case of drifting, lateral acceleration may be displayed.

In aircraft applications, colors may change as acceleration or deceleration increases and/or decreases. During taxiing, the lights may flash when preset or dynamic values are achieved. Flashing red may denote a stop as in the case of landing; flashing white may denote maximum acceleration (e.g., >1 g) as in the case of take off. There may be a warning mode. If the system detects deceleration indicative of a crash, the system may all flash to attract rescue teams.

In amusement rides, colors may change as acceleration or deceleration increases and/or decreases. The color changes may be dynamically set based upon the maximum value of acceleration or deceleration measured. A cockpit gauge may show acceleration in real time and may also stores a high value. Cockpit gauge readings may be outputted to an external display. A light show at both system startup and on-demand from the cockpit may include an artistic collage of both random and programmed light sequences that are unique and attractive.

In locomotive, subway train, and bullet train applications, colors may change as acceleration or deceleration increases and/or decreases, Color changes may be based upon a predetermined table that is utilized by all trains of the same class. The table may use colors useful in the train yard to visually display the activity and intent of moving trains. The lights may flash when preset or dynamic values are achieved. Flashing red may denote an emergency stop and may be a safety aid. A cockpit gauge may shows acceleration in real time and may be a driving aid to help the ride to be smooth for the passengers and/or the cargo. A light show at both system startup and on-demand from the cockpit may include an artistic collage of both random and programmed light sequences that are unique and attractive. There may be a warning mode. If the system detects deceleration indicative of a crash, all lights may flash to attract rescue workers.

In skydiving, colors may change as deceleration increases and/or decreases. They may be brighter during free-fall and dimmer during a glide. The lights may flash when a preset deceleration value is achieved. Colors may be used to attract attention and to signal a landing.

In boating applications, colors may change as acceleration and/or deceleration increases and/or decreases. Color changes may be based upon a predetermined table that is utilized by all boats of that class. The lighting may be useful in the dock to visually recognize the activity and intent of moving boats. The lights may flash when preset or dynamic values are achieved. Flashing red may denote an emergency stop and may be a safety aid. A cockpit gauge may show acceleration in real time and may be a driving aid to help the captain be smooth for the passengers and/or cargo. A light show may display at both system startup and on-demand and may include an artistic collage of both random and programmed light sequences that are unique and attractive. There may be a warning mode. If the system detects deceleration indicative of a crash, the lights may all flash to attract rescue workers.

In remote controlled vehicles and/or planes, color may change as acceleration or deceleration increases and/or decreases. Color changes may be dynamically set based upon a maximum value of acceleration or deceleration. The lights may flash when preset or dynamic values are achieved. Flashing red may denote an emergency stop and may be a safety aid. Flashing white may denote maximum acceleration (e.g., >1 g). All lights may flash when acceleration over a preset period of time has been achieved. A light show at both system startup and on demand may include an artistic collage of both random and programmed light sequences that are unique and attractive. There may be a warning mode. If the system detects deceleration indicative of a crash, all lights may flash to attract an operator.

In industrial safety applications (e.g., equipment and cranes), colors may change as acceleration or deceleration increases and/or decreases. Color changes may be preset based upon predetermined values. Workers can visualize the acceleration of the equipment. Flashing colors may be utilized to alert of conditions that are outside the tolerance of the equipment.

In elevators applications, colors may change as deceleration increases and/or decreases. There may be a specific color during ascent and a different specific color during decent. The lights may flash when zero acceleration and/or deceleration has been achieved. The lights may attract attention and/or speed loading and unloading.

In bull riding, horse, and rodeo applications, colors may change based upon the rate of lateral acceleration and/or deceleration. Color changes may be preset based upon predetermined maximum values. Lights may flash when exceptional values are detected. All lights may flash when a time period has been achieved, such as eight seconds.

In spacecraft, satellite, and space walking applications, colors may change as deceleration or acceleration increases and/or decreases. The lighting can be used as a safety aid in maneuvering .

The light controller 107 may include electrical components configured to implement the various functions of the light controller 107, as described herein. These components may include one or more microprocessors, microcontrollers, power supplies, and light drivers.

The acceleration/deceleration detector 103, the vehicle crash detector 105, the light controller 107, the user controls 109, and the lighting system 111 may be configured to be purchased and installed in a vehicle after it is purchased and delivered to a buyer.

The lighting system 111 may include multiple lights configured to be simultaneously attached to the outside of the vehicle at different locations. For example, the lighting system 111 may include lights configured to be simultaneously attached to the sides of the vehicle, to the top of the vehicle, to the hood of the vehicle, to the trunk of the vehicle, to the wheel wells, and/or to bumpers on the vehicle. The lights at each different location may be configured to be separately driven, thereby allowing for the lights at each location to be illuminated differently.

Figure 2:
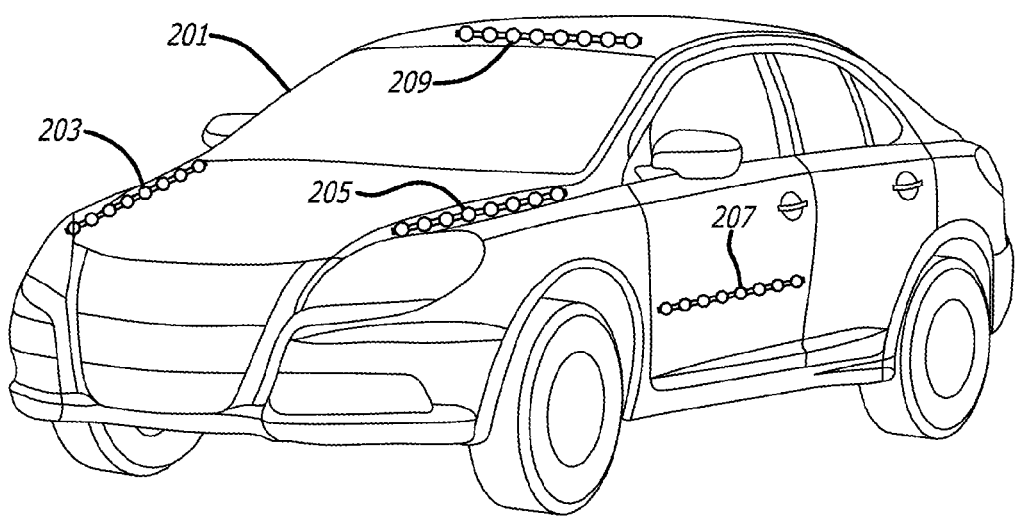
FIG. 2 illustrates an example of a vehicle and an example of a lighting system that includes multiple LED strips attached to the outside of the vehicle at different locations.

FIG. 2 illustrates an example of a vehicle 201 and an example of a lighting system 111 that includes multiple LED strips 203, 205, 207 and 209 attached to the outside of the vehicle at different locations. As illustrated in FIG. 2, LED strips 203, 205, 207, and 209 may be positioned, respectively, on the outside of the right side of the hood, on the outside of left side of the hood, on the outside of the left driver door, and on the outside of the top of the vehicle. There may also be a similar LED strip on the outside of the right door in a comparable location as LED strip 207. The light controller 107 may be configured to only drive LED strips 203, 205, and 209 when acceleration is detected by the acceleration/deceleration detector 103, and to only drive LED strip 207 and the corresponding LED strip on the outside of the right door when deceleration is detected by the acceleration/deceleration detector 103.

Additional light strips may be placed at other locations that may be driven by the light controller 107 only when a crash is detected by the vehicle crash detector 105. Conversely, one or more of the LED strips 203, 205, 207, 209, and the one on the outside of the right door may also or instead be driven by the light controller 107 when a crash is detected by the vehicle crash detector 105.

One or more these LED strips, other LED strips, or other forms of lighting may be placed elsewhere on the vehicle, such as around the front and/or rear wheel wells, horizontally below one or more of the windows, horizontally below the front and/or rear doors, and/or elsewhere and/or in a different orientation.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the systems that have been described may be configured to operate in the same way in connection with the acceleration and/or the crash of a living person (e.g., while running) and/or an animal.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

The terms and expressions used herein have the ordinary meaning accorded to such terms and expressions in their respective areas, except where specific meanings have been set forth. Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by "a" or "an" does not, without further constraints, preclude the existence of additional elements of the identical type.

The Abstract is provided to help the reader quickly ascertain the nature of the technical disclosure. It is submitted with the understanding that it will not be used to interpret or limit the scope or meaning of the claims. In addition, various features in the foregoing Detailed Description are grouped together in various embodiments to streamline the disclosure. This method of disclosure is not to be interpreted as requiring that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as separately claimed subject matter.

The invention claimed is:

1. An acceleration communication system for communicating acceleration information about a transportation apparatus to one or more persons comprising:
   a lighting system configured to be attached to the transportation apparatus;
   an acceleration detector configured to detect the direction and degree of lateral acceleration of the transportation apparatus; and
   a light controller configured to cause the lighting system to illuminate in a manner that indicates the direction and degree of the lateral acceleration detected by the acceleration detector.

2. The acceleration communication system of claim 1 wherein:
   the lighting system is configured to illuminate at different controllable intensities; and
   the light controller is configured to cause the intensity of the illumination of the lighting system to track at least three different degrees of acceleration detected by the acceleration detector.

3. The acceleration communication system of claim 1 wherein the light controller is configured to cause the lighting system to flash at a rate that tracks the degree of acceleration detected by the acceleration detector.

4. An acceleration communication system for communicating acceleration information about a transportation apparatus to one or more persons comprising:
   a lighting system configured to be attached to the transportation apparatus that provides controllable colors and intensities of illumination;
   an acceleration detector configured to detect acceleration of the transportation apparatus; and
   a light controller configured to cause the lighting system to illuminate when acceleration of the transportation apparatus is detected by the acceleration detector and to cause the color or intensity of the illumination of the lighting system to change based on the degree of acceleration detected by the acceleration detector, wherein the rate of change is dynamically set based on a maximum detected transportation apparatus acceleration.

5. The acceleration communication system of claim 1 wherein the light controller is configured to cause the lighting system to illuminate at least three different levels based on the degree of acceleration detected by the acceleration detector.

6. The acceleration communication system of claim 1 wherein the lighting system includes one or more strips of LEDs.

7. The acceleration communication system of claim 6 wherein each of the one or more strips of LEDs includes different LED color channels.

8. The acceleration communication system of claim 1 wherein:
the lighting system includes one or more lights configured to be attached to each side of the transportation apparatus; and
the light controller is configured to cause the one or more lights configured to be attached on the side of the transportation apparatus to which the transportation apparatus is laterally accelerating, as detected by the acceleration detector, to illuminate, but not the one or more lights configured to be attached on the other side of the transportation apparatus.

9. An acceleration communication system for communicating acceleration information about a transportation apparatus to one or more persons comprising:
a lighting system configured to be attached to the transportation apparatus that provides different controllable colors of illumination;
an acceleration detector configured to detect acceleration of the transportation apparatus; and
a light controller configured to cause the lighting system to illuminate when acceleration of the transportation apparatus is detected by the acceleration detector and to cause the color of the illumination of the lighting system to change based on the degree of acceleration detected by the acceleration detector, wherein:
the lighting system is configured to illuminate each color at different controllable intensities; and
the light controller is configured to:
cause the color of the illumination of the lighting system to change at stepped intervals based on the degree of acceleration detected by the acceleration detector; and
to vary the intensity of each color of illumination within each stepped interval based on the degree of acceleration detected by the acceleration detector within that stepped interval.

10. The acceleration communication system of claim 9 wherein the light controller includes a user sensitivity control configured to allow a user of the acceleration communication system to set the rate at which changes in color take place as a result of detected acceleration.

11. An acceleration/deceleration communication system for communicating acceleration and deceleration information about a transportation apparatus to one or more persons comprising:
lights configured to be attached to the front and each side of the transportation apparatus;
an acceleration/deceleration detector configured to detect the conditions of acceleration and deceleration of the transportation apparatus; and
a light controller configured to cause:
the detection of one of the conditions by the detector to cause the lights configured to be attached to the front but not the sides of the transportation apparatus to illuminate; and
the detection of the other of the conditions by the detector to cause the lights configured to be attached to the sides but not the front of the transportation apparatus to illuminate.

12. The acceleration communication system of claim 4 wherein the light controller is configured to cause the lighting system to display numerical information indicative of the degree of acceleration detected by the acceleration detector.

* * * * *